(No Model.)
E. D. MELANÇON & J. H. AYRAND, Sr.
Plow.
No. 236,828.  Patented Jan. 18, 1881.
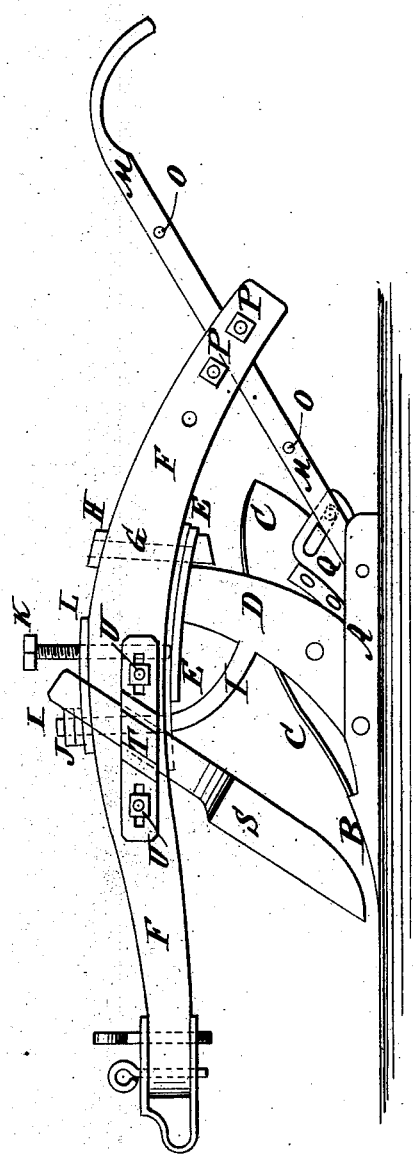
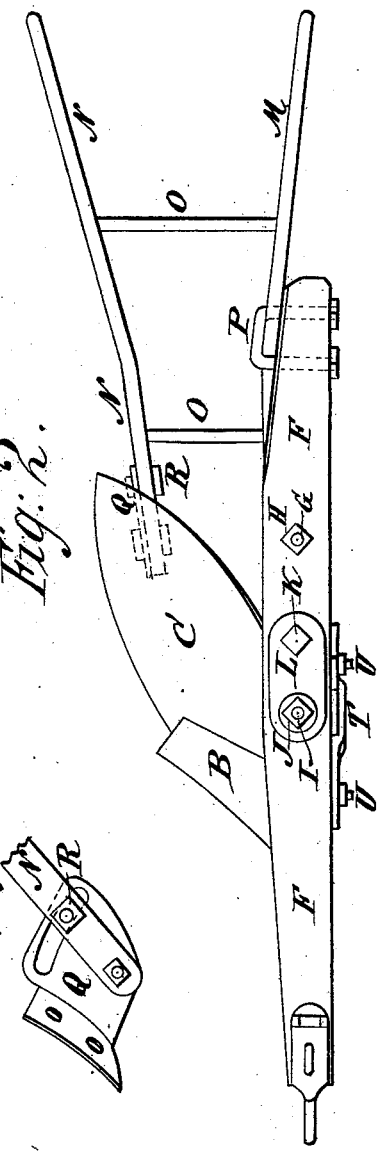
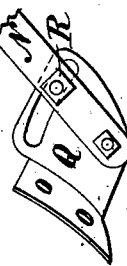
WITNESSES:
A. Schehl.
C. Sedgwick
INVENTOR:
E. D. Melancon
J. H. Ayrand Sr
BY Munn & Co
ATTORNEYS.

UNITED STATES PATENT OFFICE.

EGESIPPE D. MELANÇON AND JOHN H. AYRAND, SR., OF PAINCOURTVILLE, LOUISIANA.

PLOW.

SPECIFICATION forming part of Letters Patent No. 236,828, dated January 18, 1881.

Application filed July 14, 1880. (No model.)

*To all whom it may concern:*

Be it known that we, EGESIPPE D. MELANÇON and JOHN HENRY AYRAND, Sr., of Paincourtville, in the parish of Assumption and State of Louisiana, have invented a new and useful Improvement in Plows, of which the following is a specification.

Figure 1 is a side elevation of the improvement. Fig. 2 is a plan view. Fig. 3 is a side elevation of the support for the mold-board handle.

The object of this invention is to furnish plows so constructed that they can be readily adjusted to cut a deeper or shallower furrow, and to adapt the handles to a taller or shorter plowman.

Similar letters of reference indicate corresponding parts.

A is the landside, B is the point, and C is the mold-board, of the plow. D is the standard, upon the upper end of which is formed a cross head or plate, E, which fits against the under side of the beam F. In the rearwardly-projecting end of the plate E is formed a hole to receive a bolt, G, which passes up through the beam F, and has a nut, H, screwed upon its upper end. The bolt G may be made with an L-head to bring it close to the rear edge of the standard D.

Upon the forward side of the upper part of the standard D is formed, or to it is rigidly attached, an arm, I, which is curved forward and upward, passes up through the beam F, and has a nut, J, screwed upon its upper end.

K is a set-screw, which passes down through a nut, L, attached to the beam F, passes through the said beam F, and its forward end rests against the upper side of the forwardly-projecting end of the cross or cap plate E.

With this construction, by turning the nut J up and the screw K down, the point of the plow will be lowered to cause the plow to run deeper in the ground, and by turning the screw K up and the nut J down, the point of the plow will be raised to cause the plow to run shallower in the ground.

M is the landside-handle. N is the mold-board handle, and O are the rounds that connect the said handles.

The lower end of the landside-handle M is bolted to the rear part of the landside A. The handle M rests against and is secured to the side of the rear end of the beam F by a U-bolt, P, that passes around the said handle, through the said beam, and has nuts screwed upon its ends. Several holes are formed through the rear part of the beam F to receive the bolt P, so that the handle M can be raised and lowered as the height of the plowman may require.

The lower end of the handle N is bolted to a plate, Q, the forward part of which is bent forward, and is secured to the mold-board C by bolts or rivets. In the upper part of the plate Q is formed a slot to receive a bolt, R, so that by loosening the nut of the bolt R the handle N can be adjusted with the handle M.

S is the colter, the shank of which passes through a keeper, T, diagonally. The ends of the keeper T are slotted to receive the bolts U that pass through the beam F, so that the colter S can be adjusted by loosening the nuts of the bolts U.

Having thus fully described our invention, we claim as new and desire to secure by Letters Patent—

The standard D, having the projecting cap-plate E, and end-threaded arm I, in combination with the beam F, bolt G, screw K, and nuts H J, as and for the purpose specified.

EGESIPPE DESIREÉ MELANÇON.
JOHN HENRY AYRAND, SR.

Witnesses:
JOHN WEBRE, Jr.,
BENJAMIN BORNE.